United States Patent [19]
Maezawa et al.

[11] Patent Number: 5,127,699
[45] Date of Patent: Jul. 7, 1992

[54] DEVICE FOR REVERSIBLY SUPPORTING SEAT FOR VEHICLES

[75] Inventors: Kiyoshige Maezawa; Eitaro Taguchi, both of Osaka, Japan

[73] Assignee: Kubota Tekko Kabushiki Kaisha, Osaka, Japan

[21] Appl. No.: 442,354

[22] PCT Filed: Feb. 21, 1989

[86] PCT No.: PCT/JP89/00168
§ 371 Date: Nov. 21, 1989
§ 102(e) Date: Nov. 21, 1989

[30] Foreign Application Priority Data
Apr. 18, 1988 [JP] Japan .................................. 63-96494
Sep. 21, 1988 [JP] Japan .................................. 63-237673

[51] Int. Cl.$^5$ .............................................. B60N 1/06
[52] U.S. Cl. ................................ 296/65.1; 248/425; 180/326; 180/330
[58] Field of Search ............... 296/65.1; 248/425, 419; 297/345, 346, 349; 180/326, 329, 330

[56] References Cited

U.S. PATENT DOCUMENTS

| | | |
|---|---|---|
| 2,204,218 | 6/1940 | Hill ..................... 248/395 |
| 2,503,796 | 4/1950 | Bruhn ................... 248/94 |
| 2,821,239 | 1/1958 | Brendel et al. ......... 248/514 |
| 2,833,367 | 5/1958 | Pool et al. ............ 180/329 |
| 2,868,273 | 1/1959 | Barrett ................ 297/334 |
| 2,946,373 | 7/1960 | McCanse et al. ......... 248/421 |
| 3,189,312 | 6/1965 | Bilancia ............... 248/394 |
| 3,300,172 | 1/1967 | Noller et al. .......... 248/425 |
| 3,412,968 | 11/1968 | Rose et al. ........... 248/425 |
| 3,622,202 | 11/1971 | Brown ................. 297/344 |
| 3,756,654 | 9/1973 | Bauer ................. 297/345 |
| 4,322,052 | 3/1982 | Hodge et al. .......... 296/65.1 |

FOREIGN PATENT DOCUMENTS

| | | |
|---|---|---|
| 766073 | 8/1953 | Fed. Rep. of Germany . |
| 48-51027 | 10/1916 | Japan . |
| 14-30216 | 10/1939 | Japan . |
| 15-16568 | 6/1940 | Japan . |
| 48-26623 | 8/1946 | Japan . |
| 25-100216 | 2/1949 | Japan . |
| 48-104220 | 3/1972 | Japan . |
| 50-17536 | 5/1975 | Japan . |
| 50-38902 | 11/1975 | Japan . |
| 55-30739 | 7/1980 | Japan . |
| 57-48658 | 10/1982 | Japan . |
| 58-126532 | 8/1983 | Japan . |
| 61-5238 | 1/1986 | Japan . |

Primary Examiner—Robert R. Song

[57] ABSTRACT

The present invention relates to a device for reversibly supporting the seat of a vehicle. When a tractor or like vehicle is used for working with a backhoe or like work machine attached to the rear end of the vehicle, a forward operation seat and a rearward operation seat are conventionally needed and are therefore uneconomical. Furthermore, the work mahcine must be spaced from the vehicle body to avoid interference between the two sheets. This entails the problem of impairing the weight balance longitudinally of the vehicle. To overcome these problems, a support table is mounted on the vehicle body by a parallel link assembly which is pivotally movable longitudinally of the body, and a swivel table for supporting the seat thereon is mounted on the support table swivelably about a vertical shaft. Further provided is a lock for locking the swivel table against swiveling about the shaft, and unlocking device for unfastening the lock. The swivel table is unlocked by the unlocking device when the link assembly is raised to an upright position. The single seat is then swiveled about the shaft for forward operation and also rearward operation. The seat is locked against swiveling by the lock. When the link assembly is brought to the upright position, the seat can be unlocked by the unlocking device.

5 Claims, 10 Drawing Sheets

DEVICE FOR REVERSIBLY SUPPORTING SEAT FOR VEHICLES

BACKGROUND OF THE INVENTION

1. Field of the Invention

The present invention relates to a device for reversibly supporting a seat for vehicles.

2. Description of Related Art

When tractors or like vehicles are used for performing specified work, for example, with a backhoe or like work machine attached to the rear end of the vehicle, it is common practice to provide a seat for a rearward operation on the work machine in addition to the regular seat provided on the body of the vehicle for a forward operation thereof.

The two seats conventionally needed are therefore uneconomical. Further in the case where the work machine is attached close to the vehicle the two seats are likely to interfere with each other. Accordingly, the work machine must be attached to the vehicle body as spaced apart therefrom to avoid interference between the seats. This poses a problem with respect to the longitudinal weight balance of the vehicle.

SUMMARY OF THE INVENTION

In view of such problems of the prior art, an object of the present invention is to provide a seat reversing and supporting device which is adapted to make a single seat usable as positioned forward and also as reversed rearward and by which the seat can be reversed very efficiently.

The present invention provides a device which is characterized in that it comprises a support table mounted on a vehicle body by a parallel link assembly pivotally movable longitudinally of the vehicle body, a swivel table mounted on the support table and swivelable about a vertical axis for supporting a seat thereon, lock means for locking the swivel table against swiveling about the vertical axis, and unlocking means for unfastening the lock means when the parallel link assembly is raised to an upright position.

To change the forward or rearward orientation of the seat by the device thus characterized, the parallel link assembly is first raised to the upright position, whereby the swivel table locked by the lock means against swiveling is released by the unlocking means. When thus unlocked, the swivel table is swiveled about the vertical axis to thereby reverse the seat. The parallel link assembly is thereafter pivotally moved downward from the upright position, and the swivel table is locked by the lock means against swiveling.

The device thus eliminates the need to use two seats, assures economy, obviates the problem that two seats will interfere with each other and makes the seat reversible with extreme ease.

The present invention further provides a device which is characterized in that it comprises a support table mounted on a vehicle body by a parallel link assembly pivotally movable longitudinally of the vehicle body, springs for biasing the parallel link assembly toward an upright position, a swivel table mounted on the support table and swivelable about a vertical axis for supporting a seat thereon, lock means for locking the swivel table against swiveling about the vertical axis, and unlocking means for unfastening the lock means when the parallel link assembly is raised to the upright position, the swivel table being provided with engaging means releasably engageable with the parallel link assembly so as to permit the seat to move upward or downward in the range of not higher than a specified seat level, a suspension spring being provided for the seat.

In addition to the first feature, the second feature makes the seat comfortable to use. Preferably, the seat suspending spring is attached to one of the parallel link assembly and the vehicle body.

The present invention further provides a device which is characterized in that it comprises a support table mounted on a vehicle body by a parallel link assembly pivotally movable longitudinally of the vehicle body, a swivel table mounted on the support table and swivelable about a vertical axis for supporting a seat thereon, a lock pin provided on the support table for locking the swivel table against swiveling about the vertical axis, and an unlocking lever pivoted to the support table upwardly or downwardly movably and movable with the parallel link assembly when the parallel link assembly is raised to an upright position to release the lock pin downward from the swivel table.

Because of the above feature, the unlocking lever is pivotally movable upward or downward with the pivotal movement of the link assembly to smoothly release the lock pin downward from the swivel table and smoothly unlock this table.

BRIEF DESCRIPTION OF THE DRAWINGS

FIGS. 1 to 7 show a first embodiment of the invention;

FIGS. 8 to 13 show a second embodiment of the invention;

FIGS. 14 to 17 show a third embodiment of the invention;

DETAILED DESCRIPTION OF PREFERRED EMBODIMENTS

A first embodiment will be described with reference through FIGS. 1 to 7.

Figures 6, 7:
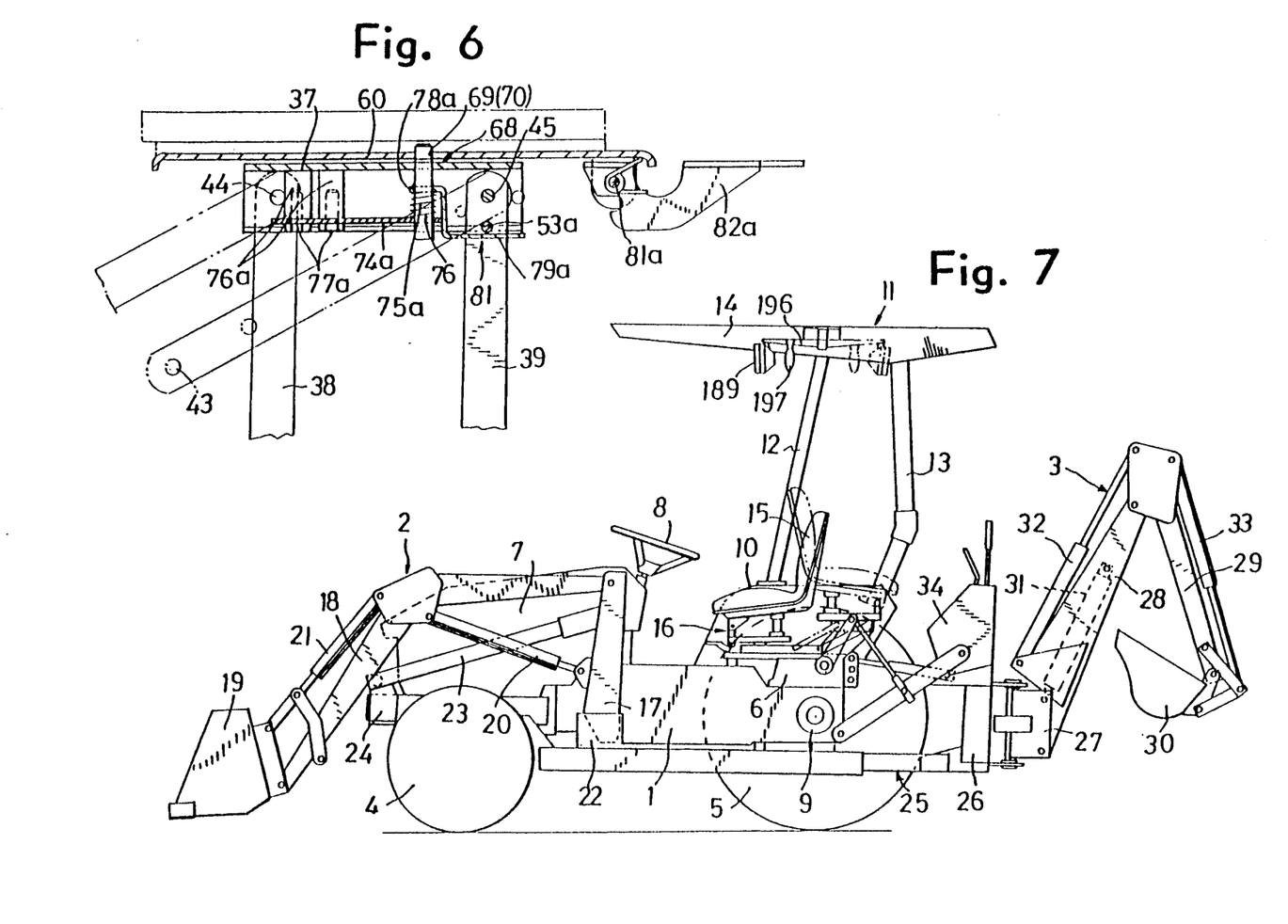
FIG. 6 is a side elevation in section of lock means.
FIG. 7 is an overall side elevation.

FIG. 7 shows a tractor body 1, and a front loader 2 and a backhoe attached respectively to the front and rear ends of the body 1. With reference to FIG. 7, the tractor body 1 has front wheels 4, rear wheels 5, and a hydraulic unit 6 at its rear portion. Indicated at 7 is a bonnet, and at 8 a steering wheel. The rear wheels 5 are supported by a rear axle case 9 on the tractor body 1 and are each covered with a rear wheel fender 10 from inside. An awning 11 comprises a pair of front posts 12, a pair of rear posts 13, and a roof 14 supported by the posts 12, 13 and is mounted on the tractor body 1 so as to cover from above a seat 15 disposed between the opposite rear fenders 10. The rear posts 13 serve also as a safety frame and are attached to the rear axle case 9. Each front post 12 is attached to the top of the rear wheel fender 10.

As will be described later, the seat 15 is mounted on the tractor body 1 by a reversibly supporting device 16 and is reversible from a forward position to a rearward position.

The front loader 2 comprises a boom 18 pivoted to the upper ends of a pair of opposed masts 17 upwardly and downwardly movably, a bucket 19 pivoted to the front end of the boom 18, a boom cylinder 20 conntected between the boom 18 and the mast 17, and a bucket cylinder 21 connected between the boom 18 and a bucket 19. Each mast 17 is removably attached to a mount 22 provided at the middle portion of the tractor body 1, and a brace 23 extending forward from the mast 17 is removably attached at its front end to a bracket 24 at the front end of the tractor body 1.

The backhoe 3 is removably attached to the tractor body 1 by connecting means 25. The backhoe 3 comprises a machine frame 26, swivel frame 27, boom 28, arm 29, bucket 30, boom cylinder 31, arm cylinder 32, bucket cylinder 33, and control box 34.

Figure 1:
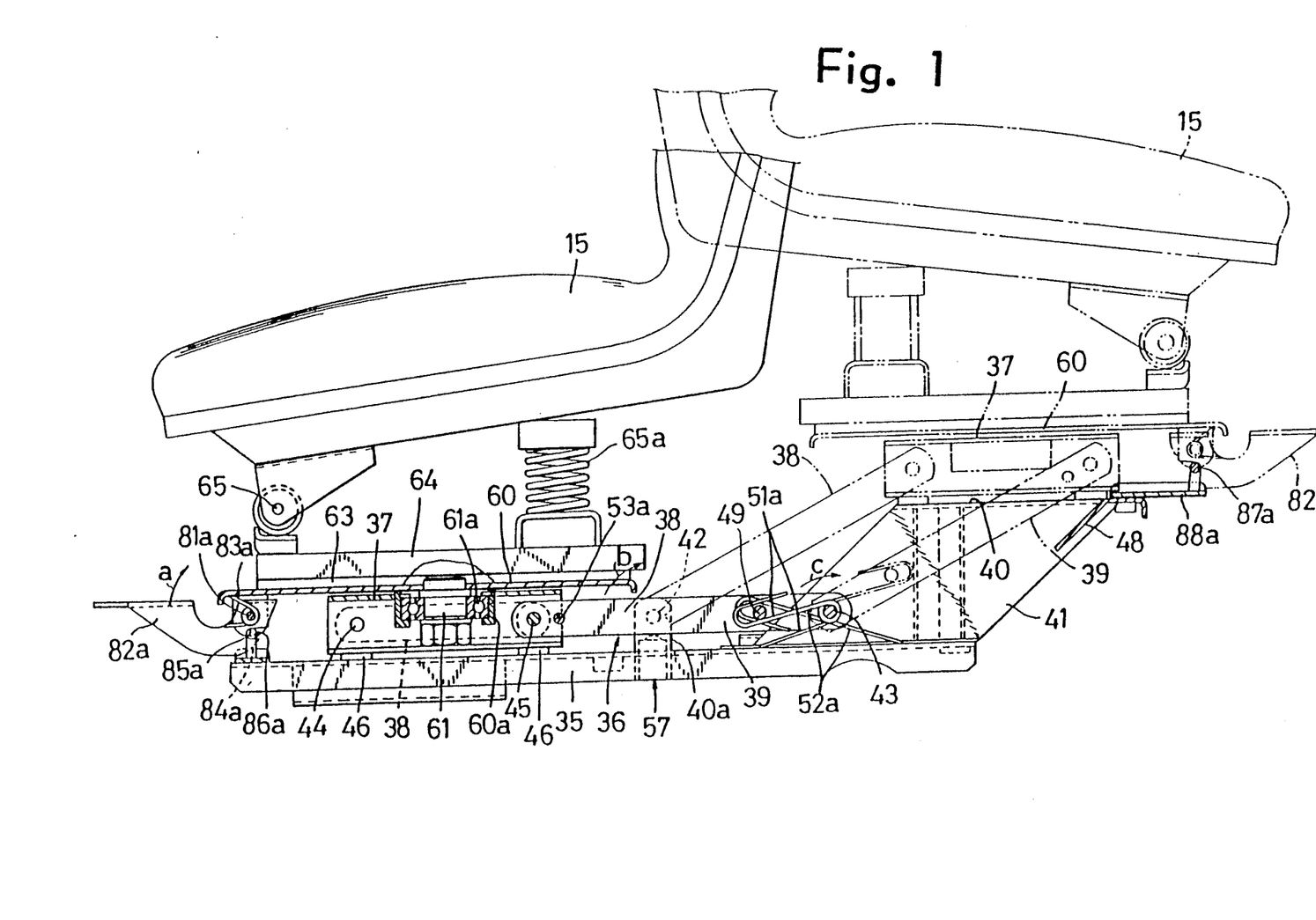
FIG. 1 is a fragmentary side elevation partly broken away.
Figure 2:
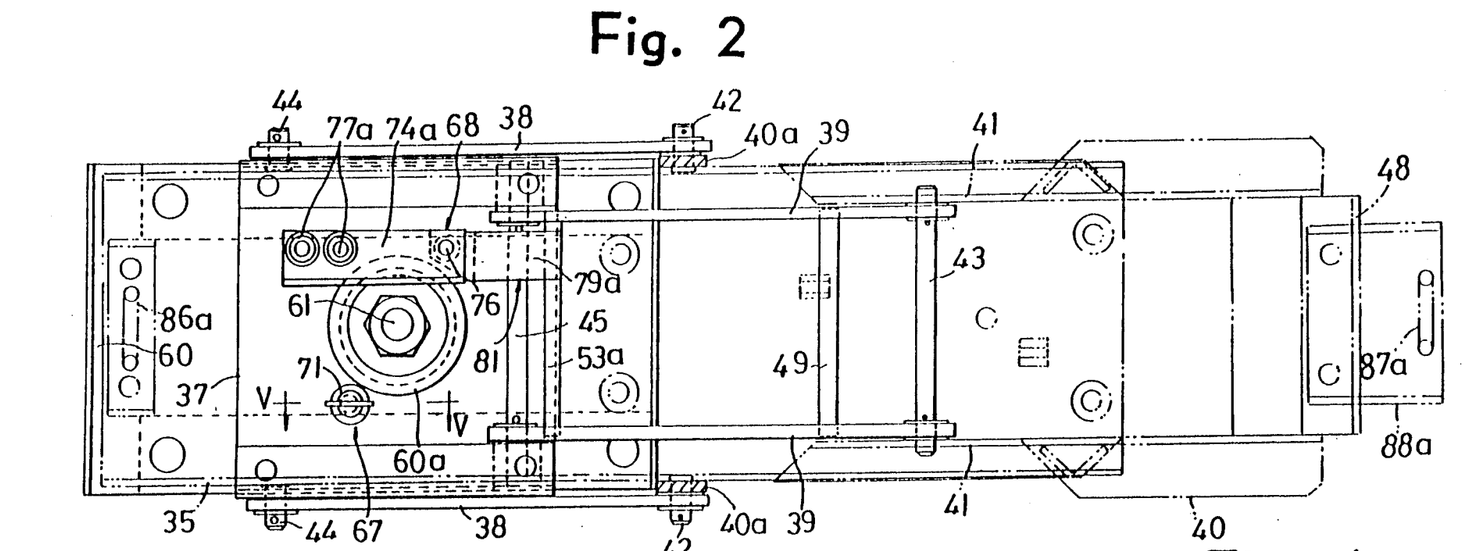
FIG. 2 is a bottom view partly broken away.
Figure 3:
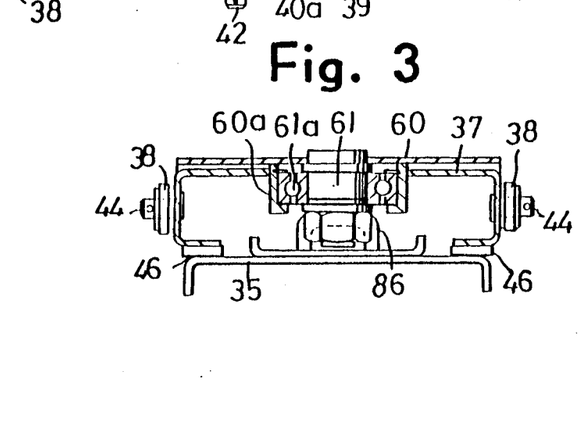
FIG. 3 is a fragmentary front view partly broken away.

The device 16 for reversibly supporting the seat 15 has the construction shown in FIGS. 1 through 6. With reference to FIGS. 1 through 3, a platelike fixed table 35 is fixed to the tractor body 1 by the hydraulic unit 6. A support table 37 is mounted on the fixed table 35 by a parallel link assembly 36 which is pivotally movable longitudinally of the tractor body.

The parallel link assembly 36 comprises a pair of opposed front links 38 and a pair of opposed rear links 39. Each front link 38 is connected at its one end to a bracket 40a at the midportion of the fixed table 35 and at the other end thereof to the front end of the support table 37 by pivots 42, 44, respectively. Each rear link 39 is connected at its one end to a side plate 41 of a support frame 40 on the fixed table 35 and at the other end thereof to the rear end of the support table 37 by pivots 43, 45, respectively.

The support table 37 has cushions 46 on its bottom and can be placed in a front position on the fixed table 35 or in a rear position on the support frame 40, with the cushions 46 provided therebetween.

The support frame 40 comprises the pair of opposed side plates 41 each bent outward at its upper end. The side plates 41 are interconnected by a connecting plate 48.

A spring engaging rod 49 and a release rod 53a are connected between the pair of opposed rear links 39. The pivot 43 has fitted therearound two pairs of helical springs 51a, 52a. The springs 51a, 52a are engaged, each at its one end, with the fixed table 35 on the front and rear opposite sides of the pivot 43, respectively, and have the other ends thereof engaged with the spring engaging rod 49. The parallel link assembly 36 is biased toward an upright position by each pair of springs 51a, 52a.

Figure 4:
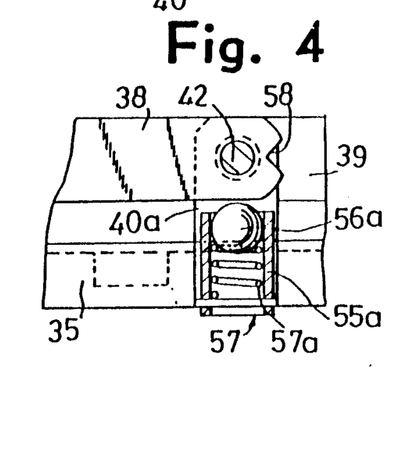
FIG. 4 is a side elevation in section of a positioning mechanism.

A positioning mechanism 57 for positioning the parallel link mechanism 36 in its upright position is provided between the front link 38 and the bracket 40a as seen in FIG. 4. The positioning mechanism 57 has an engaging recessed portion 58 formed in the base end of the front link 38, a ball 56a accommodated in a holding tube 55a on the bracket 40a so as to be releasably engageable with the recessed portion 58, and a spring 57a for biasing the ball 56a upward.

A swivel table 60 has fixed to its central portion a vertical shaft 61 which is supported by a ball bearing 61a on a bearing case 60a secured to the support table 37 centrally thereof and which is only rotatable. Accordingly, the swivel table 60 is swivelable freely about the axis of the shaft 61 relative to the support table 37. A slide plate 64 slidable forward or rearward along a pair of opposite guide rails 63 or alternatively lockable is mounted on the swivel table 60. The seat 15 is mounted on the slide plate 64 by a pivot 65 and cushion spring 65a.

The support table 37 and the swivel table 60 are provided with a positioning mechanism 67 for positioning the swivel table 60 in a position as swiveled through 180 degrees about the vertical shaft 61, lock means 68 for locking the swivel table 60 in this position against swiveling, and means 81 for unlocking the swivel table.

Figure 5:
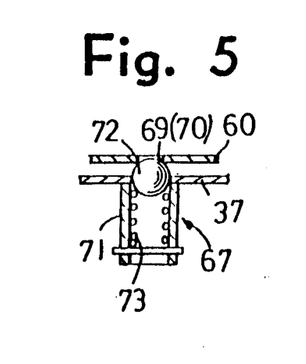
FIG. 5 is an enlarged view in section taken along the line V—V in FIG. 2.

More specifically stated with reference to FIG. 5, the positioning mechanism 67 has two engaging holes 69, 70 formed in the swivel table 60 and arranged symmetrically with respect to a point, i.e., the shaft 61, a ball 72 accommodated in a holding tube 71 of the support table 37 so as to releasably engage in one of the holes 69, 70, and a spring 73 for biasing the ball 72 upward.

The lock means 68 comprises a lock pin 76 provided on the support table 37 so as to releasably engage in the other of the holes 69, 70 and is constructed as shown in FIG. 6. The lock pin 76 is upwardly or downwardly slidably supported by the support table 37 and a bracket 74a and is biased upward by a spring 75a. The bracket 74a is fastened by bolts 77a to bosses 76a secured to the support table 37.

The unlocking means 81 has a spring retainer 78a secured to the lock pin 76 and having one end which is bent to an L-shape to provide a release engaging portion 79a. The release engaging portion 79a is positioned under the release rod 53a on the rear links 39. When the parallel link assembly 36 is raised to its upright position, the release rod 53a comes into engagement with the engaging portion 79a to depress the lock pin 76 and unlock the swivel table.

A clamp lever 82a is attached by a pivot 81a to the front end of the swivel table 60 and biased downward by a spring 83a. The clamp lever 82a has an arcuate guide portion 84a and an engaging recessed portion 85a adjacent thereto. The recessed portion 85a is releasably engageable with an engaging member 86a or 87a on the fixed table 35 or the support frame 40. The engaging members 86a, 87a are each an inverted U-shaped. The engaging member 86a is secured to the fixed table 35, and the engaging member 87a to a plate 88a projecting rearward from the connecting plate 48.

The first embodiment will be used in the following manner. The seat is locked in the solid-line position of FIGS. 1 and 7 during working with the loader or normal operation. It is fixed in the phantom-line position shown in FIGS. 1 and 7 during working with the backhoe.

In the solid-line position, the swivel table 60 is locked to the support table 37 by the lock means 68 against swiveling, and the engaging recessed portion 85a of the clamp lever 82a is in engagement with the engaging member 86a on the fixed table 35.

When the seat 15 is to be reversed from the solid-line position rearward to the phantom-line position, the clamp lever 82a is first pushed upward (as indicated by an arrow a) to unlock the swivel table 60 from the fixed table 35, whereupon the front and rear links 38, 39 of the parallel link assembly 36 are pivotally moved upward about the pivots 42, 43, respectively, as indicated by arrows b and c, by means of the springs 51a. Consequently, the link assembly 36 is raised. When the assembly is brought to its upright position, the ball 56a engages in the recessed portion 58 of the positioning mechanism 57, while the springs 51a, 52a act in opposite directions, so that the link assembly 36 is held in the upright position.

On the other hand, during the pivotal movement of the rear links 39 before the assembly is brought to the upright position, the release rod 53a of the unlocking means 81 comes into engagement with the release engaging portion 79a to pull down the lock pin 76 against the spring 75a, with the result that the lock means 68 is unfastened to unlock the swivel table 60 from the support table 37 and thereby render the swivel table 60 free to swivel. Further since the swivel table is fully lifted by the rise of the link assembly 36, the seat 15 can be swiveled to the rearward position without contacting the levers in the neighborhood.

When the seat 15 is reversed rearward, the ball 72 of the positioning mechanism 67 engages in the hole 70 to position the swivel table 60 in place. Next, the parallel link assembly 36 is inclined rearward against the springs 52a. In a manner reverse to the above, the lock pin 76 of the lock means 68 then engages in the hole 69 to lock the swivel table 60 to the support table 37. When the link assembly is further inclined to place the support table 37 on the support frame 40, the engaging portion 85a of the clamp lever 82a engages with the engaging member 87a to lock the support table 37 onto the support frame 40 against upward or downward movement, whereby the seat 15 is completely reversed to its rearward position. When the backhoe is used for working, the position of the seat 15 becomes higher by an amount corresponding to the level of the support frame 40.

A second embodiment will be described with reference to FIGS. 8 through 13.

Figures 12, 13:
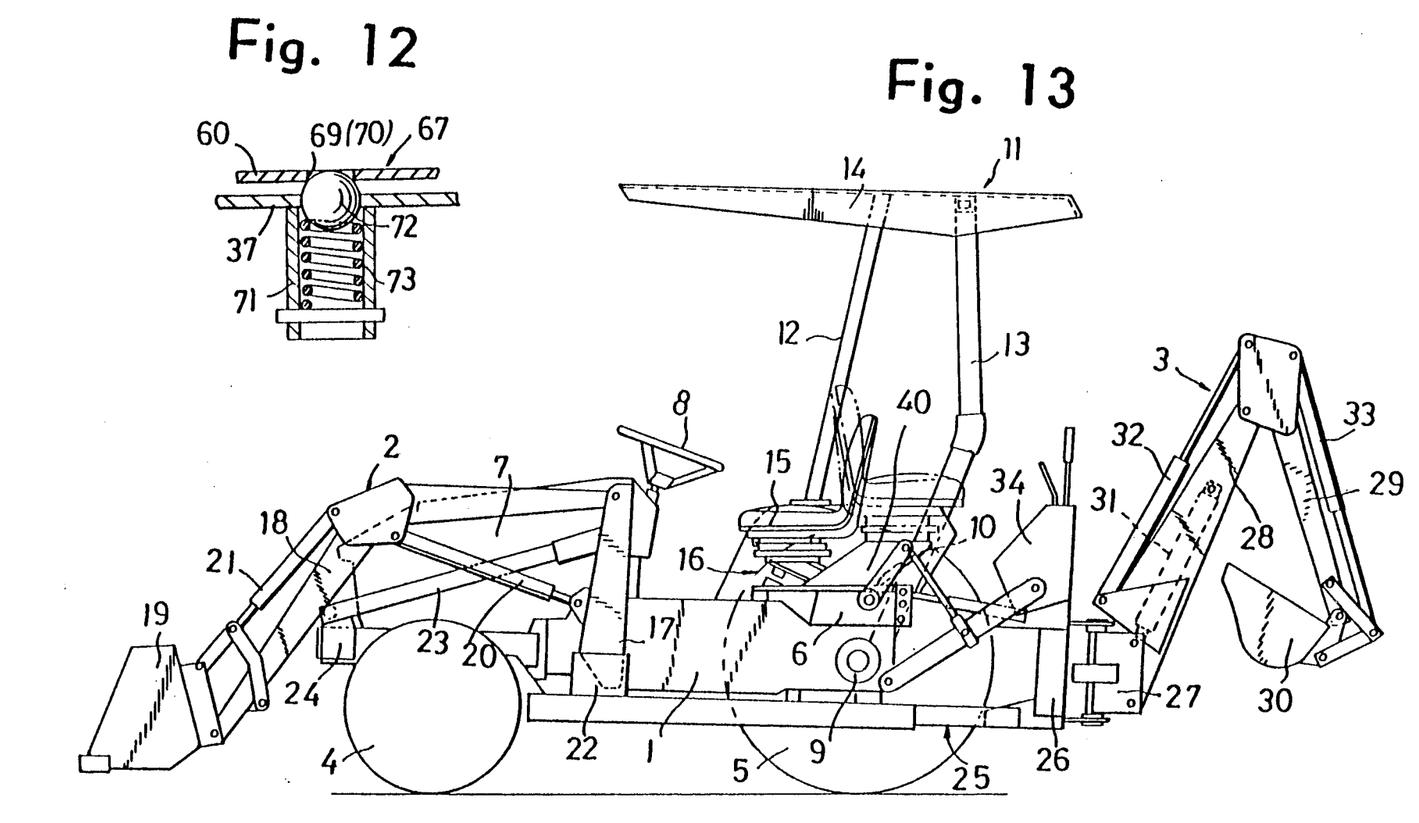
FIG. 12 is an enlarged view in section taken along the line XII—XII in FIG. 9.
FIG. 13 is an overall side elevation.

FIG. 13 shows a tractor body 1, and a front loader 2 and a backhoe 3 attached to the front and rear ends of the body 1, respectively. With reference to FIG. 13, the second embodiment has the same construction as the first except for the device for reversibly supporting the seat, so that like parts ar designated by like reference numerals and will not be described again.

Figure 8:
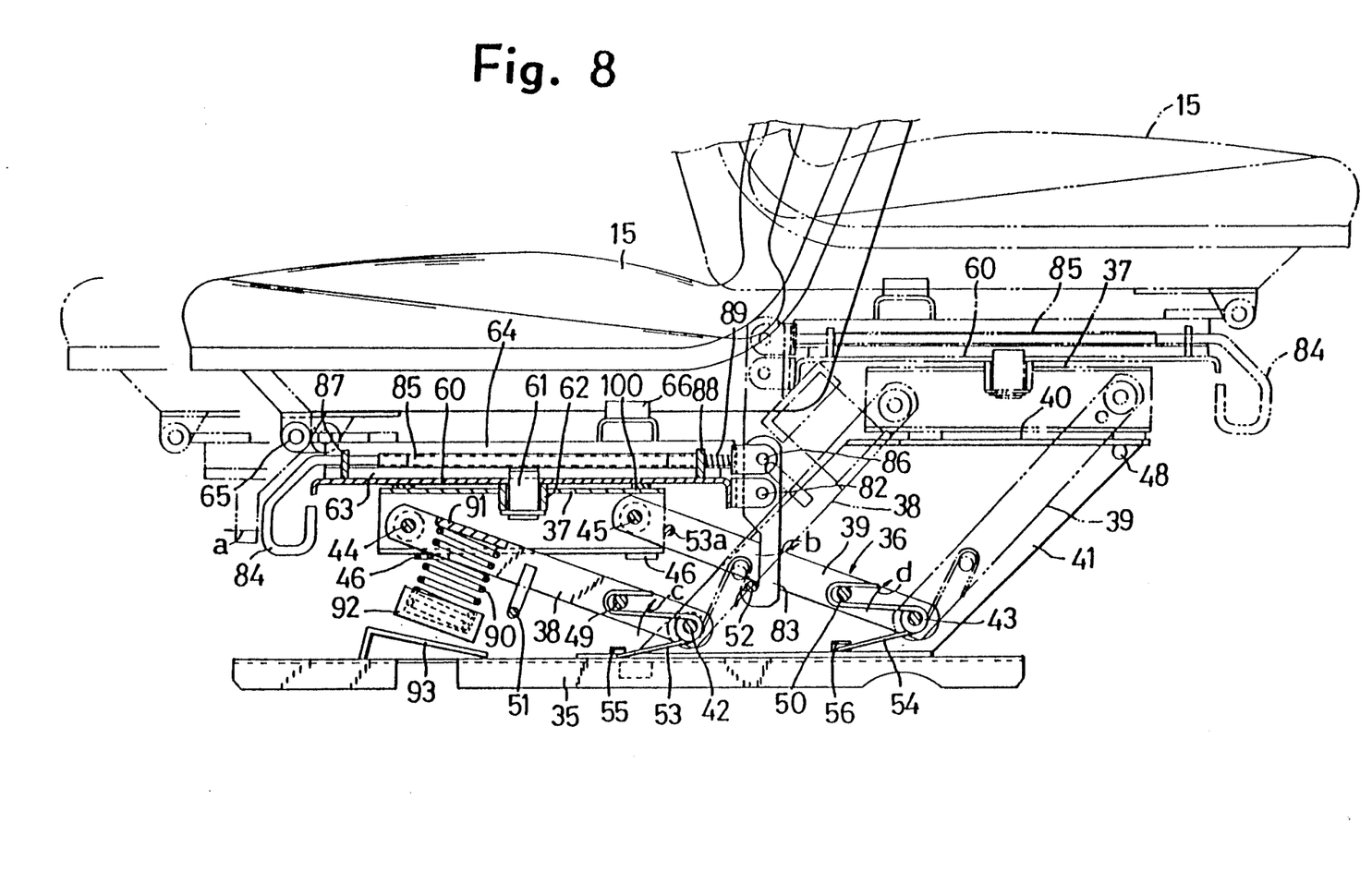
FIG. 8 is a fragmentary side elevation in section.
Figures 9, 10, 11:
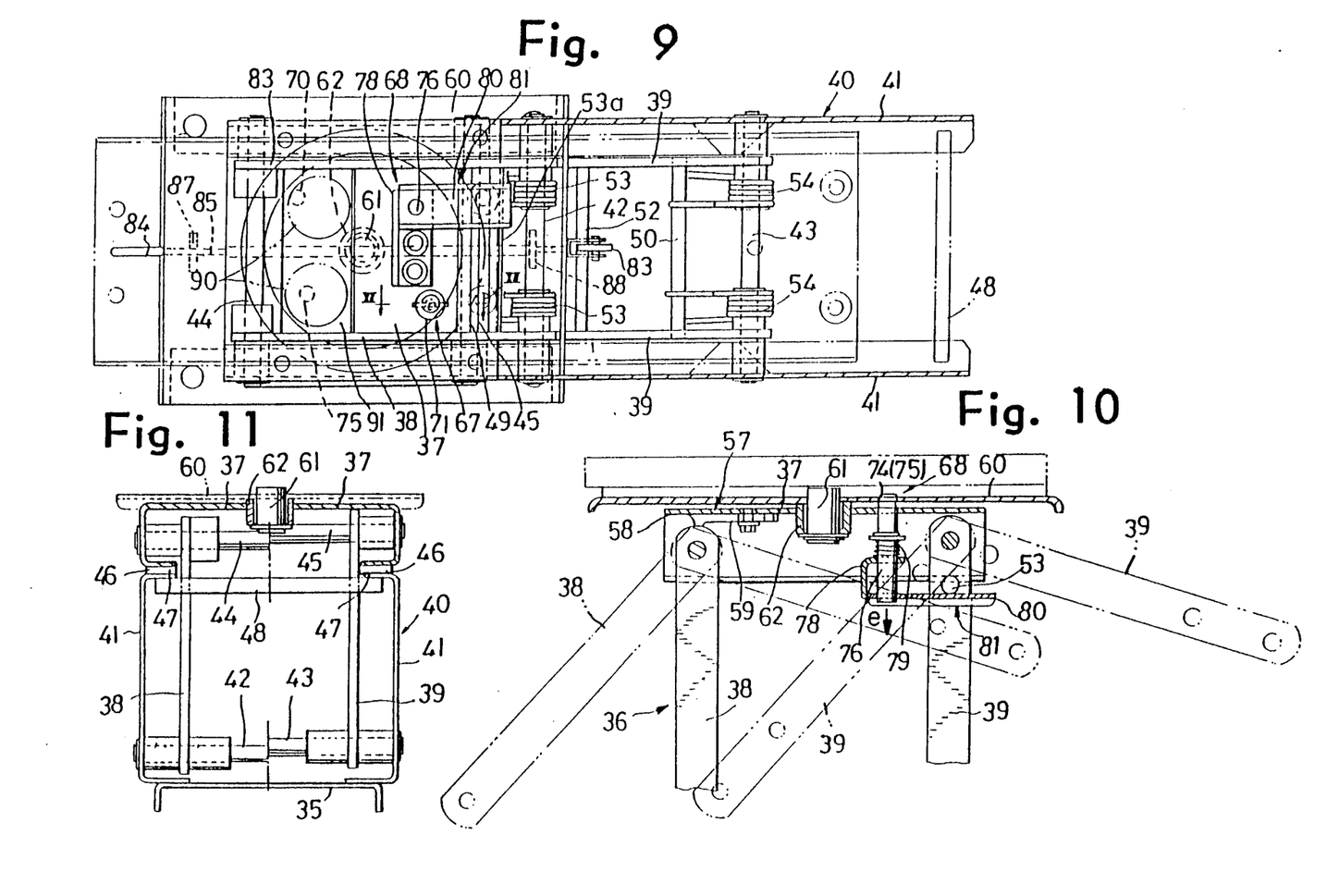
FIG. 9 is a fragmentary bottom view.
FIG. 10 is a side elevation in section showing the embodiment when a link assembly is in its upright position.
FIG. 11 is a rear view in section showing the same as mounted on a support frame.

The seat reversing-supporting device 16 of the second embodiment has the construction shown in FIGS. 8 through 12. Referring to FIGS. 8 and 9, a platelike fixed table 35 is secured to the tractor body 1 by a hydraulic unit 6. A support table 37 is mounted on the fixed table 35 by a parallel link assembly 36 which is pivotally movable longitudinally of the tractor body. The assembly 36 comprises a pair of front links 38 and a pair of rear links 39. The front link 38 and the rear link 39 are supported, each at its one end, by pivots 42, 43, respectively, on a pair of opposed side plates 41 of a support frame 40 mounted on the fixed table 35, and are supported at the other ends thereof by pivots 44, 45, respectively, on the support table 37.

The support table 37 has cushions 46 on its bottom and is spaced apart from the fixed table 35 thereabove when in a forward position. When in a rearward position, the support table 37 can be placed on the top of the support frame 40 with the cushions provided therebetween as seen in FIG. 11. The support frame 40 comprises a pair of opposed side plates 41 each bent at its upper end as indicated at 47. The side plates 41 are interconnected by a connecting bar 48. Spring engaging rods 49, 50, as well as engaging rods 51, 52, are connected between the pair of front links 38 and the pair of rear links 39, respectively. In the vicinity of the pivot 45, a release rod 53a is connected between the rear links 39. Helical springs 53, 54 fitted around the respective pivots 42, 43 are held, each at one end thereof, by spring engaging portions 55, 56 of the fixed table 35, respectively, and have the other ends thereof engaged by the respective spring engaging rods 49, 50. The parallel link assembly 36 is biased toward an upright position by these springs 53, 54.

With reference to FIG. 10, a mechanism 57 for positioning the link assembly 36 in its upright state is provided between the front link 38 and the support table 37. The positioning mechanism 57 has an engaging recessed portion 58 formed in the upper end of the front link 38, and a resilient engaging plate 59 attached to the support table 37.

As shown in FIGS. 8 through 10, a swivel table 60 has attached to its central portion a vertical shaft 61, which is supported by a bearing boss 62 secured to the support table 37 centrally thereof and which is only rotatable. Accordingly, the swivel table 60 is free to swivel about the axis of the shaft 61 relative to the support table 37. A slide plate 64 slidable forward or rearward along a pair of opposed guide rails 63 or lockable is mounted on the swivel table 60. The seat 15 is mounted on the slide plate 64 by a pivot 65 and rubber cushion 66.

The support table 37 and the swivel table 60 are provided with a mechanism 67 for positioning the swivel table 60 as swiveled through 180 degrees about the vertical shaft 61, lock means 68 for locking the table 60 in this position, and means 81 for unlocking the table 60.

More specifically stated with reference to FIG. 12, the positioning mechanism 67 has two engaging holes 69, 70 formed in the swivel table 60 and arranged symmetrically with respect to a point, i.e., the shaft 61, a ball 72 accommodated in a holding tube 71 of the support table 37 so as to releasably engage in one of the holes 69, 70, and a spring 73 for biasing the ball 72 upward.

The lock means 68 has two engaging holes 74, 75 arranged symmetrically with respect to a point, i.e., the center of the vertical shaft 61, and a lock pin 76 provided on the support table 37 upwardly or downwardly slidably so as to releasably engage in one of the holes 74, 75. The means is so constructed as seen in FIG. 10. More specifically, the lock pin 76 is upwardly or downwardly slidably supported by the support table 37 and a bracket 78 and is biased upward by a spring 79. The bracket 78 is secured to the support table 37.

The unlocking means 81 has a release engaging plate 80 provided on the lock pin 76. The engaging plate 80 is positioned under the release rod 53a on the rear links 39, such that when the parallel link assembly 36 is raised to its upright position, the release rod 53a comes into engagement with the engaging plate 80 to pull down the lock pin 76 and unfasten the lock. Thus, the unlocking means 81 comprises the release rod 53a and the release engaging plate 80. The plate 80 is movable only upward or downward by being guided by the bracket 78.

An engaging member 83 is movably attached to the rear end of the swivel table 60 by a pivot 82. The engaging member 83 releasably engages with the engaging rod 51 or 52 of the parallel link mechanism 36 so as to permit the seat 15 to move upward or downward in the range of up to the solid-line level thereof shown in FIG. 8 when the seat is in the forward position or up to the phantom-line level of the seat when it is in the rearward position.

A release handle 84 for moving the engaging member 83 is disposed at the midportion of the front end of the swivel table 60. The handle 84 is operatively connected to the engaging member 83 by a coupling rod 85 and a pin 86. The coupling rod 85 is inserted through a pair of front and rear guide plates 87, 88 on the swivel table 60 and is slidable forward or rearward. A spring 89 is provided around the rear end of the coupling rod 85 for biasing the member 83 toward the engaging direction.

A suspension spring 90 is attached to a spring bearing plate 91 interconnecting the pair of front links 38. A spring cover 92 made of synthetic resin or the like is fitted over the lower end of the spring 90. On the other hand, the fixed table 35 is provided with a spring bearing portion 93 for the spring cover 92 to bear thereagainst.

The second embodiment is used in the manner to be described below. The seat 15 is locked in the solid-line position of FIGS. 8 and 13 for working with the loader or for the usual operation, or is locked in the phantom-line position of FIGS. 8 and 13 for working with the backhoe.

In the solid-line state, the swivel table 60 is locked to the support table 37 by the lock means 68 against swiveling, with the engaging member 83 in engagement with the engaging rod 52 of the link assembly 36. In this cse, the support table 37, etc. are movable upward or downward below the solid-line level of the seat, so that when the operator is seated in the seat 15, the device lowers in its entirety with the cover 92 of the suspension spring 90 bearing on the spring bearing portion 93 on the fixed table 35. The spring 90 therefore produces a suspension effect.

To rearwardly reverse the seat 15 from the solid-line position to the phantom-line position, the release handle 84 is first pulled forward (in the direction of arrow a in FIG. 8), moving the engaging member 83 about the pivot 82 toward the direction of arrow b out of engagement with the engaging rod 52 to release the seat 15 in the solid-line level. The front and rear links 38, 39 of the parallel link assembly 36 are therefore pivotally moved upward in the direction of arrows c and d about the pivots 42, 43, respectively, by the springs 53, 54, whereby the link assembly 36 is raised. When the assembly is brought to its upright position, the resilient engaging plate 59 engages in the recessed portion 58 of the positioning mechanism 57, so that the link assembly 36 is held in the upright position.

On the other hand, during the pivotal movement of the rear links 39 before the assembly is brought to the upright position, the release rod 53a of the unlocking means 81 comes into engagement with the release engaging plate 80 to pull down the lock pin 76 (as indicated by arrow e in FIG. 10) against the spring 79, with the result that the lock means 68 is unfastened to unlock the swivel table 60 from the support table 37 and thereby render the swivel table 60 free to swivel. Further, since the swivel table is fully lifted by the rise of the link assembly 36, the seat 15 can be swiveled to the rearward position without contacting the levers in the neighborhood.

When the seat 15 is reversed rearward, the ball 72 of the positioning mechanism 67 engages in the hole 70 to position the swivel table 60 in place. Next, the parallel link assembly 36 is inclined rearward against the springs 53, 54. In a manner reverse to the above, the lock pin 76 of the lock means 68 then engages in the hole 75 to lock the swivel table 60 to the support table 37 against swiveling. When the link assembly 36 is further inclined to place the support table 37 on the support frame 40, the engaging member 83 engages with the engaging rod 51 of the link assembly 36 to lock the support table 37 onto the support frame 40 against upward or downward movement, whereby the seat 15 is completely reversed to its rearward position. When the backhoe is used for working, the operator is seated in the seat 15 in the phantom-line position.

According to the second embodiment, the seat 15 in the rearward position is locked to the support frame 40, whereas the seat in the rearward position may be supported upwardly or downwardly movably, with a suspension spring also provided on the frame 40. The suspension spring 90 may be attached to the spring bearing portion 93. To render the swivel table 60 smoothly swivelable, a seat ring 100 of synthetic resin is provided on the bottom face of the table 60.

A third embodiment will be described with reference to FIGS. 14 through 17.

The third embodiment differs from the second embodiment in the construction of support frame 40, the construction of lock means 68 and the construction of the unlocking means 81 but otherwise has the same construction as the second, so that like parts are designated by like reference numerals and will not be described again.

The support frame 40 of the third embodiment has opposed side paltes 41 having a smaller height than those of the second embodiment. A stopper 41a is provided between and attached to the side plates 41. The rear links 39 of the parallel link assembly 36 as pivotally moved rearward bear on the stopper 41a, whereby the seat 15 is located in the phantom-line position in FIG. 14. The stopper 41a which is prepared by bending a strip to a V-shape interconnects the opposed side plates 41 for reinforcement.

Figure 14:
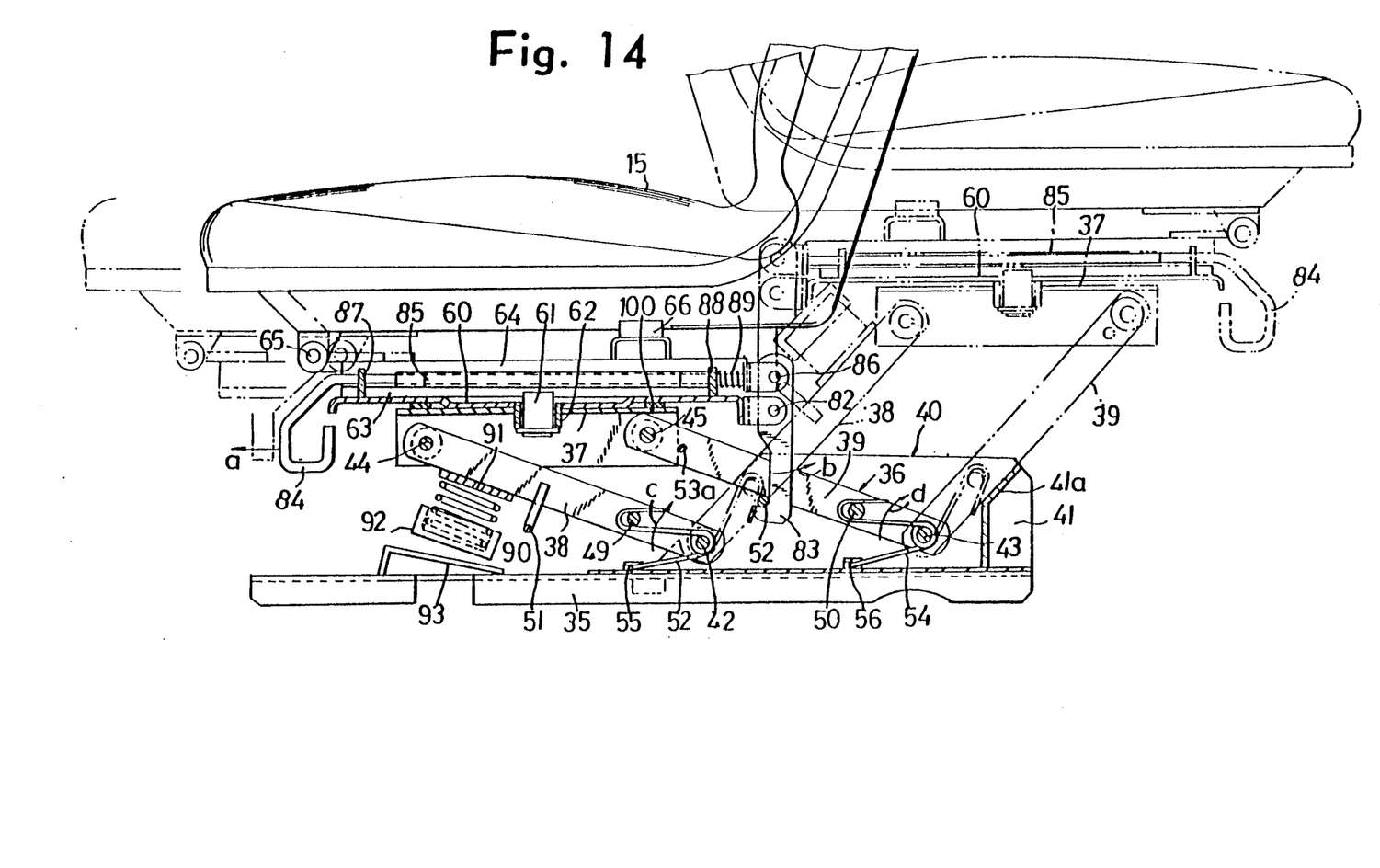
FIG. 14 is a fragmentary side elevation in section.
Figure 15:
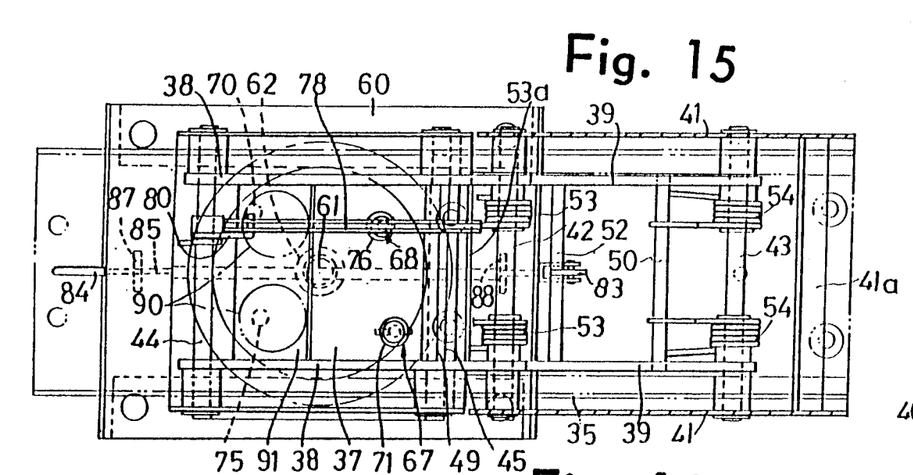
FIG. 15 is a fragmentary bottom view.
Figure 16:
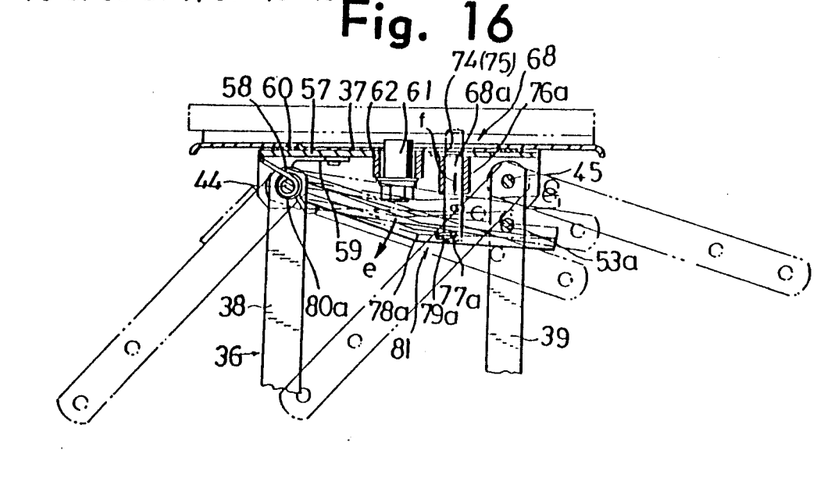
FIG. 16 is a side elevation in section showing the embodiment when a link assembly is in an upright position.
Figure 17:
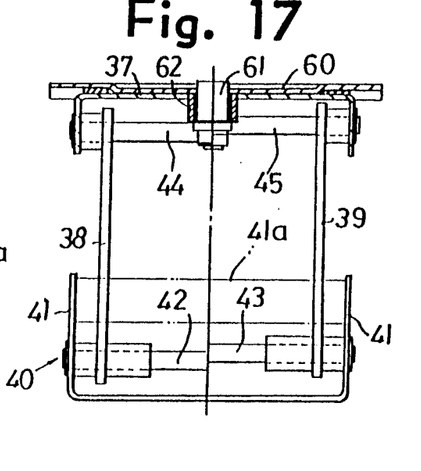
FIG. 17 is a sectional rear view.

The lock means 68 of the third embodiment has two engaging holes 74, 75 arranged symmetrically with respect to a point, i.e., the center of the vertical shaft 61, and a lock pin 68a releasably engageable with one of the holes 74, 75. The lock pin 68a is provided on the support table 37 by a guide tube 76a upwardly or downwardly slidably.

The unlocking means 81 has an engaging pin 77a at the lower end of the lock pin 68a. The engaging pin 77a is slidably inserted through a slit 79a in a release lever 78a. The release lever 78a has a front end upwardly or downwardly supported by the pivot 44 and a rear end extending rearward under the release rod 53a. When the parallel link assembly 39 is raised to its upright position, the release lever 78a is engaged by the release rod 53a and moved downward, thereby pulling the lock pin 68a downward and unlocking the swivel table 60 from the support table 37. The release lever 78a is biased upward by a helical spring 80a wound around the pivot 44.

To rearwardly reverse the seat 15 from the solid-line position to the phantom-line position by the third embodiment, the release handle 84 is first pulled forward (in the direction of arrow a in FIG. 14), moving the engaging member 83 about the pivot 82 toward the direction of arrow b out of engagement with the engaging rod 52 to release the seat 15 in the solid-line level. The front and rear links 38, 39 of the parallel link assembly 36 are therefore pivotally moved upward in the direction of arrows c and d about the pivots 42, 43, respectively, by the springs 53, 54, whereby the link assembly 36 is raised. When the assembly is brought to its upright position, the resilient engaging plate 59 engages in the recessed portion 58 of the positioning mechanism 57, so that the link assembly 36 is held in this position.

On the other hand, during the pivotal movement of the rear links 39 before the assembly is brought to the upright position, the release rod 53a on the rear links 39 engages the release lever 78a from above, moving the release lever 78a downward (as indicated by arrow e in FIG. 16) about the pivot 44 against the spring 80a to pull down the lock pin 68a as indicated by arrow f. The lock pin 68a is therefore released from the hole 74 in the swivel table 60 to unlock the swivel table 60 from the support table 37 and thereby render the swivel table 60 free to swivel. Further, since the swivel table is fully lifted by the movement of the assembly 36 to the upright position, the seat 15 can be swiveled to the rearward position without contacting the levers in the vicinity thereof.

When the seat 15 is reversed rearward, the ball 72 of the positioning mechanism 67 engages in the hole 70 to position the swivel table 60 in place. Next, the parallel link assembly 36 is inclined rearward against the springs 53, 54. In a manner reverse to the above, the release lever 78a is moved upward by the spring 80, with the result that the lock pin 76a engages in the hole 75 to lock the swivel table 60 to the support table 37 against swiveling. When the assembly 36 is further inclined to bring the rear links 39 into contact with the stopper 41a, the engaging member 83 engages with the engaging rod 51 of the link assembly 36 to lock the support table 37 against upward or downward movement, whereby the seat 15 is completely reversed to its rearward position.

Figure 18:
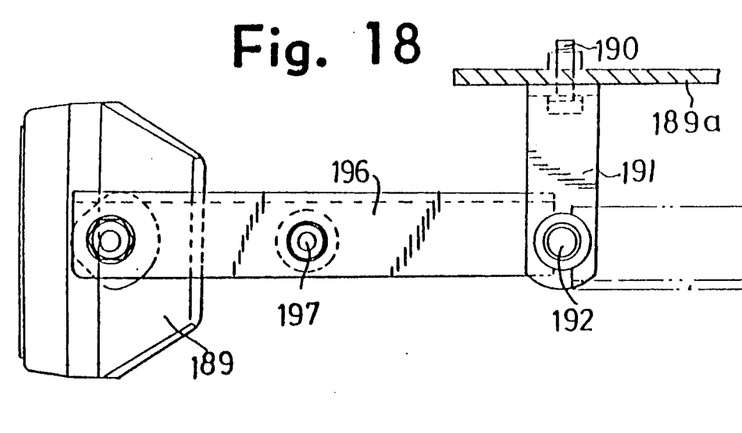
FIG. 18 is a plan view of a work light support assembly.

The roof 14 of the first embodiment is provided on each of its opposite sides with a work light 189 which is reversible from a forward position to a rearward position. More specifically stated with reference to FIGS. 18 through 20, a U-shaped bracket 191 is attached to a side wall portion 189a of the roof 14 with bolts 190. A vertical fixed rod 192 is connected between the outer ends of arms of the bracket 191, with a positioning member 193 provided on the lower arm. The positioning member 193 is in the form of a cam having two protrusions arranged on its upper side symmetrically with respect to a point. A boss 194 is rotatably provided around the fixed rod 192 and positioned on the positioning member 193. The boss 194 is biased downward with a spring 195. The work lamp 189 is mounted on the outer end of an arm 196 projecting forward from the boss 194. A downwardly extending handle 197 is attached to an intermediate portion of the arm 196. By virtue of the engagement of the boss 194 with the positioning member 193, the arm 196 can be positioned in a forward position or a rearward position along the roof 14 as specified. Accordingly, when the front loader 2 is used for working, the work light 189 is brought to the forward position as indicated in solid line in FIG. 7, while when the backhoe 3 is used for excavation, the work light 189 is brought to the phantom-line rearward position shown in FIG. 7. Thus, the work light 189 is usable for either type of work. The wiring for the work light 189 is provided preferably via a portion close to the fixed rod 192.

Figures 19, 21:
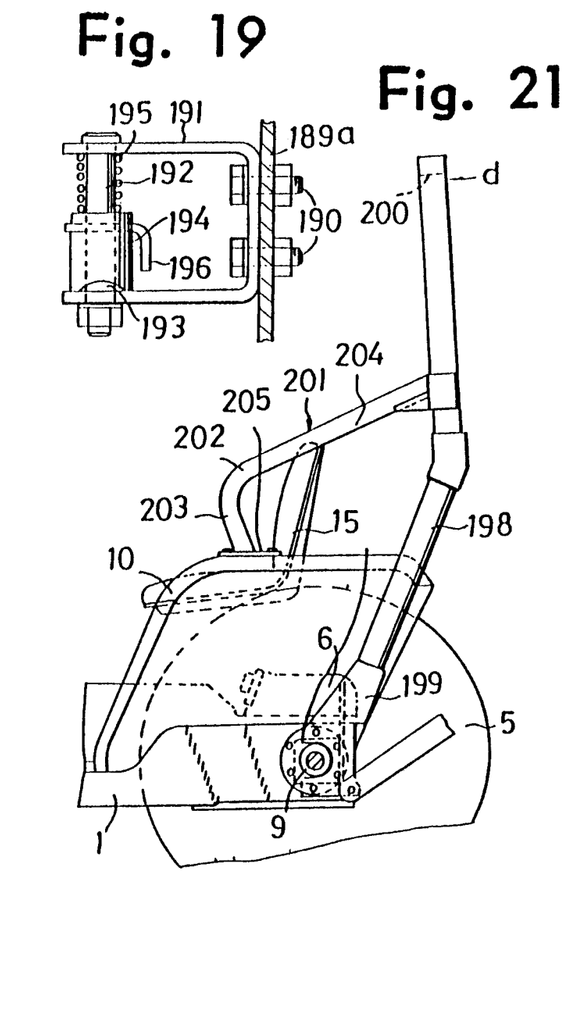
FIG. 19 is a rear view in section of the same.
FIG. 21 is a side elevation partly broken away and showing a reinforcement for a two-post safety frame.
Figure 20:
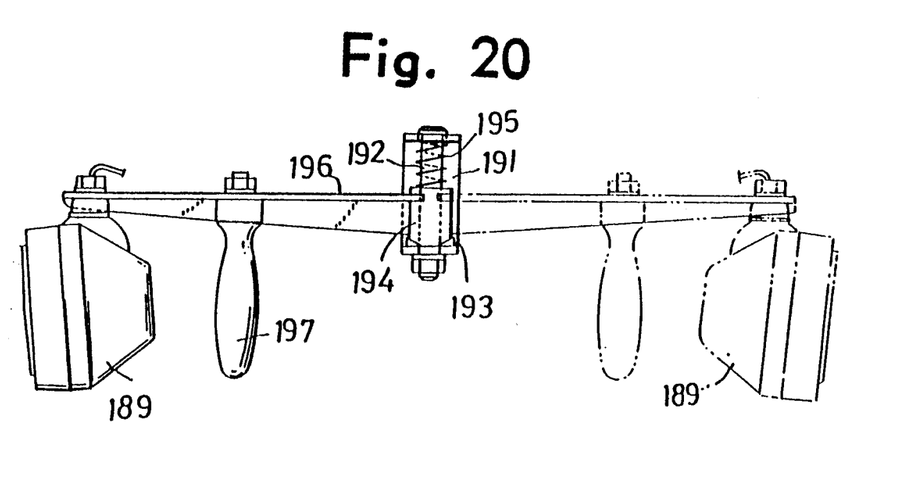
FIG. 20 is a side elevation of the same.
Figure 22:
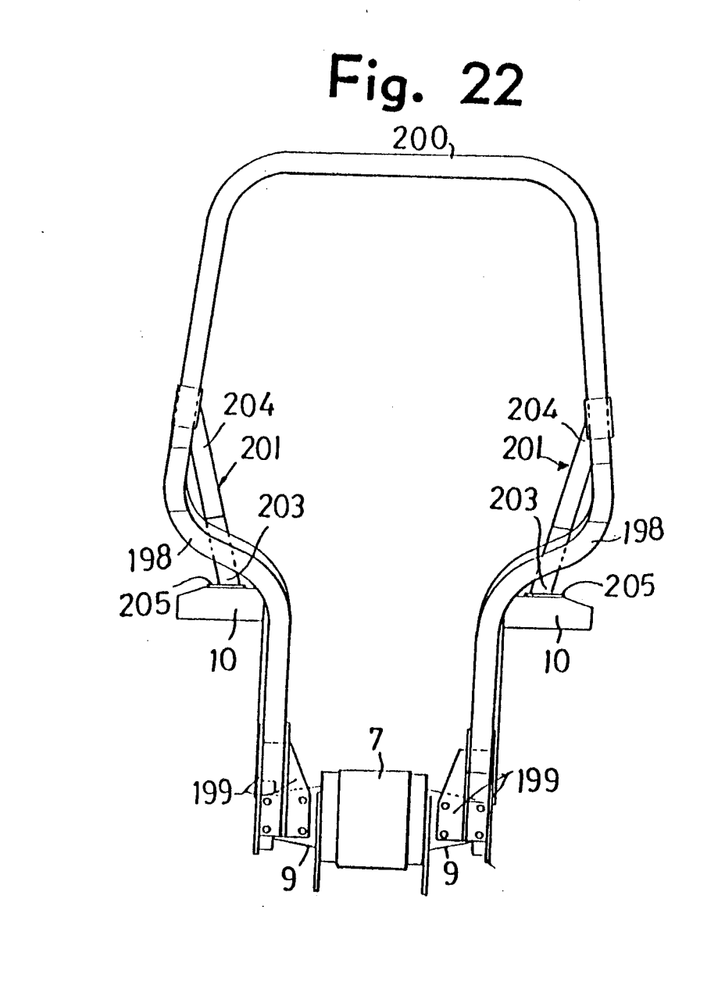
FIG. 22 is a rear view of the same.

The safety frame can be in the form of a two-post safety frame 198 as shown in FIGS. 21 and 22. The frame 198 has a lower end fixed to the rear axle case 9 by a bracket 199 and an upper end connected to the corresponding one on the other side by a connecting portion 200. A vertically intermediate portion of the safety frame 198 is connected to the top front portion of the rear wheel fender 10 by a handrail member 201. The handrail member 201 has a vertical rod portion 203 and a slanting rod portion 204 which are interconnected by an arcuate bent portion 202. The vertical rod portion 203 has at its lower end a connecting plate 205 fastened to the rear wheel fender 10 with bolts. The rear end of the slanting rod portion 204 is fixed to the safety frame 198.

With the structure described, the handrail member 201 serves to reinforce the safety frame 198, while if a force of impact acts on the upper end of the safety frame 198 from the rear in the direction of arrow d, the force is absorbed by the deformation of the bent portion 202 of the handrail member 201.

Figures 23, 24:
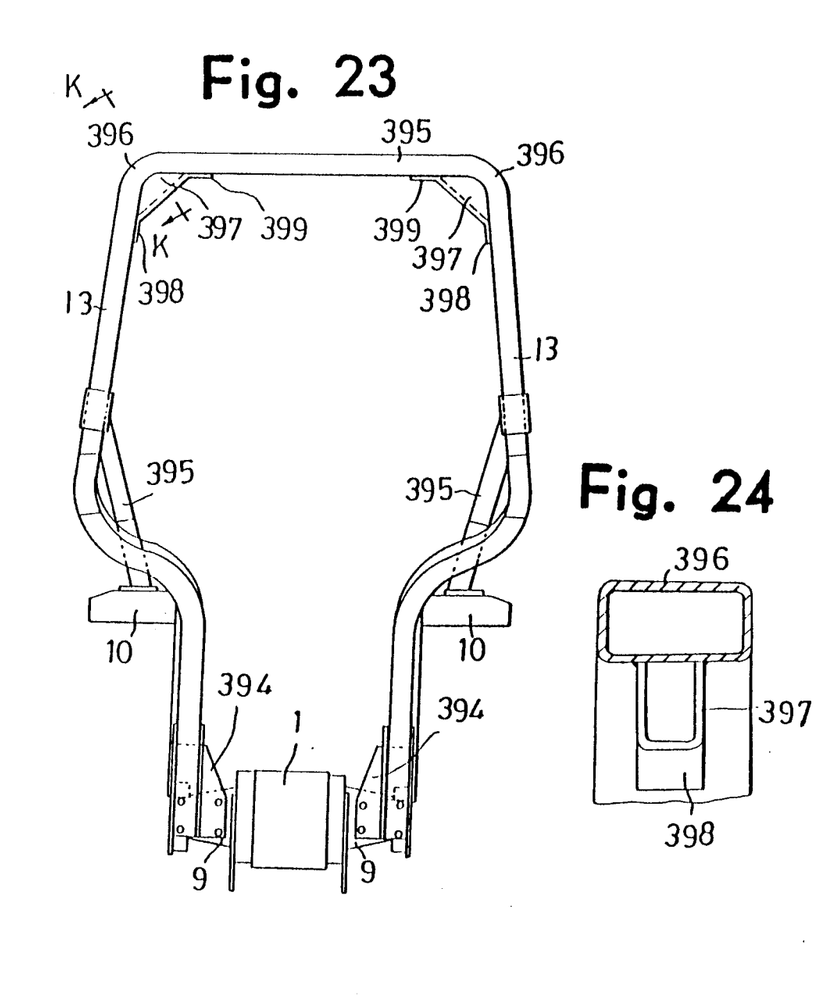
FIG. 23 is a rear view showing a rear post assembly.
FIG. 24 is an enlarged view in section taken along the line K—K in FIG. 23.

With the second embodiment, the rear post 13 has a lower end fixed to the rear axle case 9 by a bracket 394 and is connected at its upper end to the corresponding one on the other side by a connecting portion 395. A vertically intermediate portion of the rear post 13 is connected to the top front portion of the rear wheel fender 10 by a handrail member 395 as seen in FIG. 23. The rear posts 13 and the connecting portion 395 are formed by bending a tube of rectangular cross section to the shape of a gate, and a reinforcement rib 397 is welded to each bent corner portion 396 on the inner side thereof as seen in FIGS. 23 and 24. The reinforcement rib 397 is U-shaped in cross section and has at its opposite ends projecting pieces 398, 399 which are joined to the rear post 13 and the connectiong portion 395, respectively.

INDUSTRIAL APPLICATION

The invention is applicable to vehicle seats which are to be changed over between a forward position and a rearward position for the operator.

We claim:

1. A device for reversibly supporting a vehicular seat, comprising:
   a parallel link assembly mounted on a vehicular body, said parallel link assembly being pivotally movable longitudinally of a vehicular body;
   a support table mounted substantially flat on ends of said parallel link assembly, with forward, upward and backward positional mobility;
   means for biasing said parallel link assembly toward an upright position;
   a swivel table having a hole formed therein and mounted on said support table and turnable about a vertical shaft, wherein the vehicular seat is attached to said swivel table;
   a lock pin vertically shiftably mounted on said support table for releasably engaging with the hole formed in said swivel table;
   lock means, including a resilient member, for biasing said lock pin toward the hole formed in said swivel table;
   unlock means including a first unlock member mounted on said lock pin and a second unlock member mounted on said parallel link assembly, for disengaging an engagement of said lock pin with the hole formed in said swivel table by displacing said lock pin when said parallel link assembly is raised to an upright position.

2. The device according to claim 1, further including engaging means for engaging with said parallel link assembly, said link assembly being movable within a limited range when said engaging means is engaged and movable through an unlimited range when said engaging means is released, and a fastening rod provided with said parallel link assembly for releasably fastening said engaging means.

3. The device according to claim 1, wherein a suspension spring is provided for supporting the vehicular seat in a space between said parallel link assembly and the vehicular body.

4. The device according to claim 1, wherein said parallel link assembly includes a front link and a back link, the vertical shaft is positioned about intermediate between the front link and the back link, the hole formed within said swivel table is positioned on a circular line about the vertical shaft and on a diametric line, the first unlock member is an L-shaped member fixed to said lock pin, and the second unlock member is a rod mounted on the back link for releasably engaging with an upper face of the first unlock member.

5. The device according to claim 1, wherein the first unlock member includes a release lever and a fastening pin fixed to the lock pin for engaging an elongate hole provided with the release lever, wherein the second unlock member releasably engages with the release lever.

* * * * *